United States Patent
Tai et al.

(10) Patent No.: US 10,456,882 B2
(45) Date of Patent: Oct. 29, 2019

(54) FIXTURE FOR THIN-WALLED WORKPIECE

(71) Applicant: Industrial Technology Research Institute, Hsin-Chu (TW)

(72) Inventors: Chung-Yu Tai, Kaohsiung (TW); Ke-Hen Chen, Taichung (TW); Ci-Rong Huang, Taoyuan (TW); Ta-Jen Peng, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 208 days.

(21) Appl. No.: 15/822,741

(22) Filed: Nov. 27, 2017

(65) Prior Publication Data

US 2019/0118318 A1 Apr. 25, 2019

(30) Foreign Application Priority Data

Oct. 20, 2017 (TW) .............................. 106136219 A

(51) Int. Cl.
*B25B 5/16* (2006.01)
*B23Q 3/06* (2006.01)
(Continued)

(52) U.S. Cl.
CPC .......... *B23Q 3/065* (2013.01); *B23B 31/1075* (2013.01); *B23C 3/13* (2013.01);
(Continued)

(58) Field of Classification Search
CPC .......... B25B 1/2457; B25B 1/00; B25B 1/08; B25B 5/00; B25B 11/00; B25B 11/02; B23Q 3/065
See application file for complete search history.

(56) References Cited

U.S. PATENT DOCUMENTS 3,923,414 A    12/1975   Hopkins
4,877,228 A * 10/1989   Ripert .................... H01R 43/28
                                                         269/156
(Continued)

FOREIGN PATENT DOCUMENTS

CN    201017175 Y    2/2008
CN    102310368 A    1/2012
(Continued)

OTHER PUBLICATIONS

Taiwan Patent Office "Office Action" dated May 3, 2018, Taiwan.
(Continued)

*Primary Examiner* — Lee D Wilson
(74) *Attorney, Agent, or Firm* — WPAT, PC

(57) ABSTRACT

A fixture for a thin-walled workpiece includes two clamping devices. Each of the clamping devices has a metal carrier and a damper. The metal carrier has a carrying portion and a supporting portion, where the supporting portion has a stair portion having a plane surface and a standing surface with a slope. The damper has a metal clamping portion and a damping portion. One end of the metal clamping portion is formed as an inclined surface. The damping portion has at least two elastic layers and at least one metal layer, which are laminated in an interlacing arrangement with the same slope of the inclined surface. One of the elastic layers is disposed to connect the inclined surface. The end of the metal clamping portion connecting the elastic layer is located on the stair portion, while the opposite end of the metal clamping portion protrudes out of the supporting portion.

9 Claims, 8 Drawing Sheets

(51) Int. Cl.
  *B23C 3/13* (2006.01)
  *G01M 7/02* (2006.01)
  *B23B 31/107* (2006.01)
  *B23Q 17/09* (2006.01)
  *B23Q 11/00* (2006.01)
  *B25B 1/24* (2006.01)
  *B23Q 39/02* (2006.01)
  *B23C 9/00* (2006.01)

(52) U.S. Cl.
  CPC .......... *B23Q 3/063* (2013.01); *B23Q 11/0032* (2013.01); *B23Q 17/0971* (2013.01); *B25B 1/2457* (2013.01); *G01M 7/022* (2013.01); *B23B 2215/64* (2013.01); *B23C 9/005* (2013.01); *B23Q 39/022* (2013.01)

(56) References Cited

U.S. PATENT DOCUMENTS

| | | | | |
|---|---|---|---|---|
| 5,056,766 | A * | 10/1991 | Engibarov | B25B 1/08 269/101 |
| 6,126,158 | A * | 10/2000 | Engibarov | B25B 5/08 269/101 |
| 7,187,432 | B2 | 3/2007 | Matsui | |
| 8,928,860 | B2 | 1/2015 | Hempenius et al. | |
| 9,844,855 | B1 * | 12/2017 | Chen | B25B 1/08 |
| 2006/0108729 | A1 * | 5/2006 | Siegel | B25B 1/08 269/266 |
| 2010/0230882 | A1 | 9/2010 | Zhang | |
| 2014/0283368 | A1 | 9/2014 | Geng | |
| 2019/0118318 | A1 * | 4/2019 | Tai | B23Q 3/065 |

FOREIGN PATENT DOCUMENTS

| | | |
|---|---|---|
| CN | 102672540 B | 10/2014 |
| CN | 203956584 U | 11/2014 |
| CN | 205201377 U | 5/2016 |
| CN | 106002360 A | 10/2016 |
| CN | 106271716 A | 1/2017 |
| CN | 205927763 U | 2/2017 |
| CN | 206393510 U | 8/2017 |
| TW | 363485 | 7/1999 |
| TW | 201521963 A | 6/2015 |
| WO | WO2012/079637 A1 | 6/2012 |
| WO | WO2013/077584 A1 | 5/2013 |

OTHER PUBLICATIONS

Kiran Kolluru et al., "A solution for minimising vibrations in milling of thin walled casings by applying dampers to workpiece surface", 2013, pp. 415-418, CIRP Annals—Manufacturing Technology, Rolls-Royce University Technology Centre (UTC) in Manufacturing, Faculty of Engineering, University of Nottingham, UK.

Ma Junjin et al., "Vibration suppression of thin-walled workpiece machining considering external damping properties based on magnetorheological fluids flexible fixture", Jun. 21, 2016, pp. 1074-1083, Chinese Journal of Aeronautics, Key Laboratory of Contemporary Design and Integrated Manufacturing Technology, Ministry of Education, Northwestern Polytechnical University, Xi'an 710072, China.

* cited by examiner

FIXTURE FOR THIN-WALLED WORKPIECE

CROSS REFERENCE TO RELATED APPLICATION

The present application is based on, and claims priority from, Taiwan Application Serial Number 106136219, filed on Oct. 20, 2017, the disclosure of which is hereby incorporated by reference herein in its entirety.

TECHNICAL FIELD

The present disclosure relates in general to a fixture for workpieces, and more particularly to a fixture for a thin-walled workpiece that provides an inclined shock-absorbing surface for multi-dimensional vibration modes to damp the corresponding vibrations in machining the thin-walled workpiece and thus to assure the machining around a steady state.

BACKGROUND

In the art, prior to machining of a thin-walled workpiece (for example, an aerospace thin-walled blade), a simple-structured fixture or screws are usually applied to position tightly the thin-walled workpiece on a machine platform. Referring to FIG. 6, two conventional clamping devices 90 are applied to clamp individually at two opposing ends of a workpiece 20, in which each the clamping device 90 is consisted of a base structure 92 and a cover plate 91. Both the base structure 92 and the cover plate 91 are made of metallic materials. After this assembly as shown in FIG. 6 is sent for machining or milling at both sides thereof, the final thin-walled product of the workpiece 20 is shown in dashed lines.

While in milling or machining a coarse embryo or a medium embryo, a larger portion of material would be removed, and also a demand in efficient machining is always true at this stage. Thus, vibrations resulted from the machining would be significant, especially at a process of machining the workpiece thinner and thinner, from which stiffness of the workpiece would become too low to sustain vibrations or shaking. Namely, as a steady-state domain for the machining becomes restricted and smaller, choices upon machining parameters for maintaining the machining within the steady-state domain would be extremely limited. Thereupon, work efficiency of the machining would be poor. Hence, to prevent the machining of the workpiece from less accuracy and a lower yield due to machining perturbations, the vibrations induced during the machining shall be damped, and also the machining shall be processed in a steady state.

In the art, a conventional shock absorber or damper for the workpiece is usually hung exterior to or contacted with the workpiece, and is generally performed by a spring. It is understood that such a design can only damp the vibration within a limited frequency range (i.e., for a single vibration mode). However, for a thin-walled workpiece, it is quite possible that more than one natural frequency (corresponding to different mode shapes) for the thin-walled workpiece may exist around the work frequency of the machining. Thus, under such a circumstance, vibrations related to the rest of modes, other than the one to which the damper is targeted, will be merely affected by the damper.

In addition, a conventional fixture with a damping ability is usually able to damp the vibration in a unique direction. However, since the mode shape of the workpiece may be three-dimensional, thus a stress analysis shall be performed in advance to locate the position of the maximum shearing stress, such that a damping means can then be appropriately applied to restrain the corresponding mode shape.

Accordingly, a topic of finding a fixture for a thin-walled workpiece that can provide an inclined shock-absorbing surface for multi-dimensional vibration modes is definitely urgent for damping most of the vibration modes of the thin-walled workpiece during the machining, and for assuring the machining to be operated around a steady state.

SUMMARY

In this disclosure, in a preferred embodiment, the fixture for a thin-walled workpiece includes two clamping devices. Each of the two clamping devices further includes a metal carrier and a damper. The metal carrier further includes a carrying portion having a carrying surface and a supporting portion located on the carrying portion. The supporting portion has a stair portion at a top thereof further having a plane surface and a standing surface with a slope. The damper further includes a metal clamping portion and a damping portion. The metal clamping portion has an end formed as an inclined surface with another slope identical to the slope of the standing surface. The damping portion has at least two elastic layers and at least one metal layer laminated in an interlacing arrangement and having the same slope as the inclined surface. One of the at least two elastic layers is connected with the inclined surface of the metal clamping portion. Each of the at least one elastic layer is made of an elastic non-metallic material.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
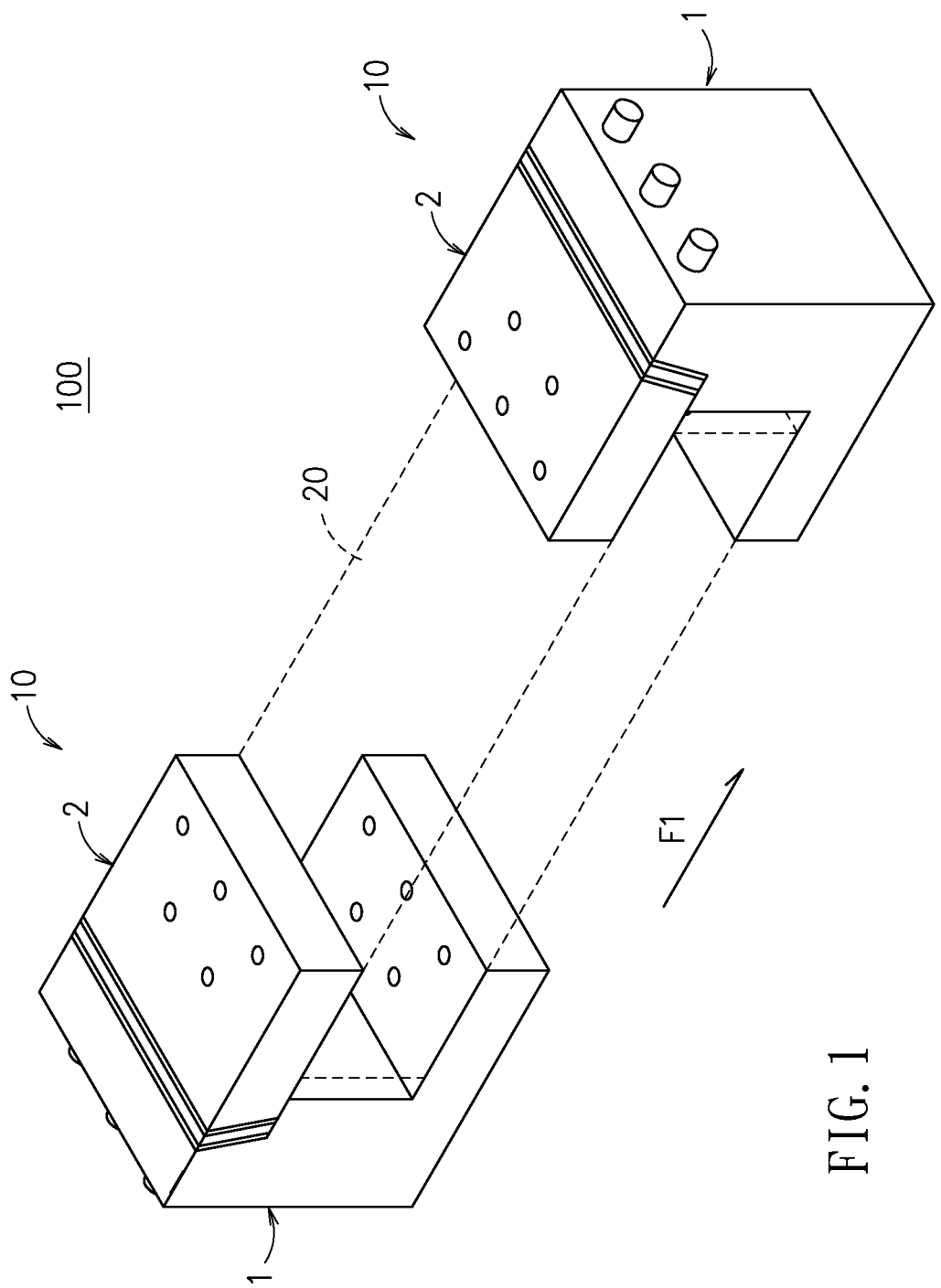
FIG. 1 is a schematic perspective view of a fixture for a thin-walled workpiece in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
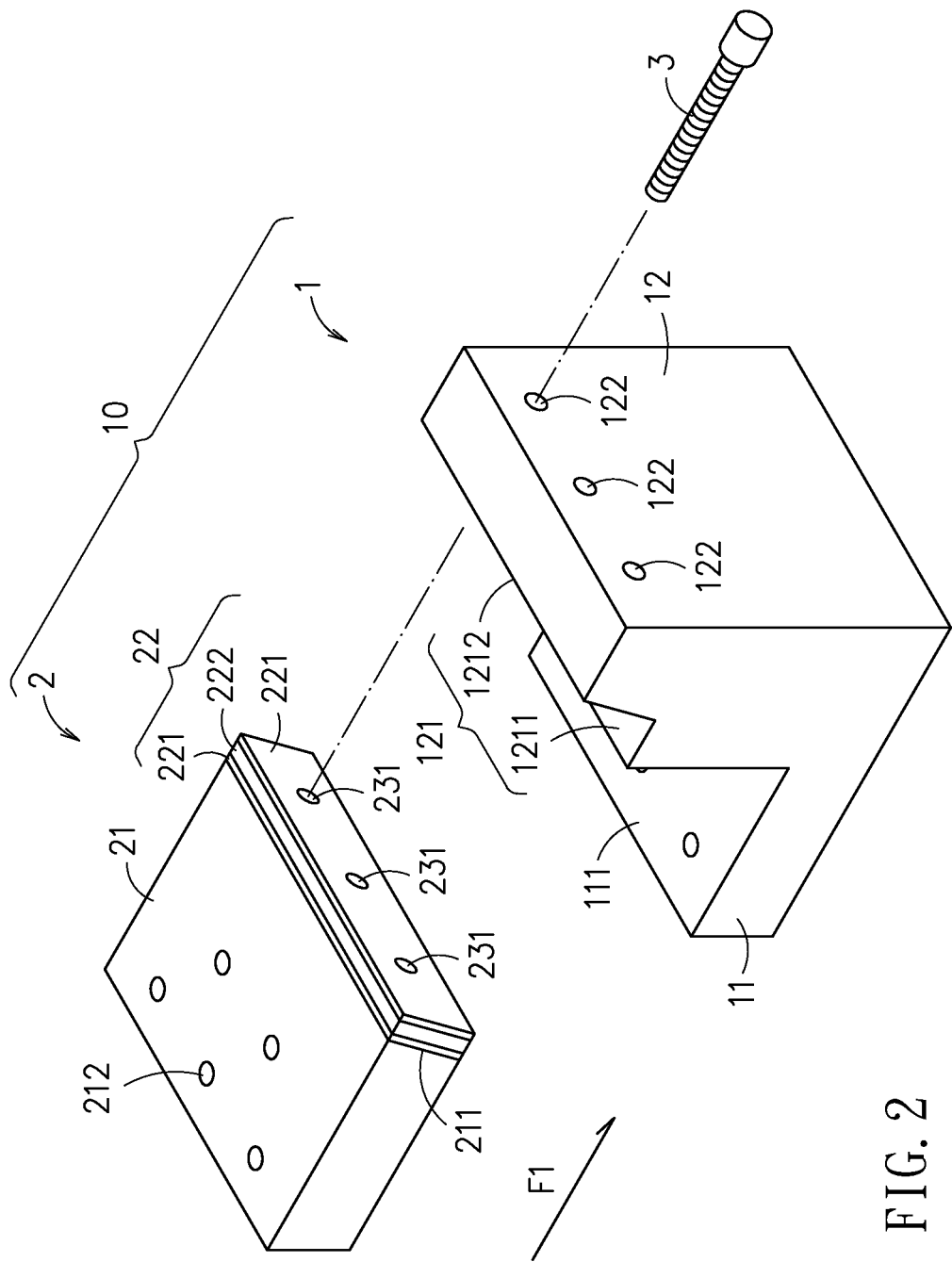
FIG. 2 is a schematic exploded view of a clamping device of FIG. 1.

Referring now to FIG. 1 and FIG. 2, the fixture for a thin-walled workpiece 100 includes two clamping devices 10 oppositely and symmetrically arranged in a first direction F1, so that a workpiece 20 (in dashed lines) can be clamped in between.

Figure 3:
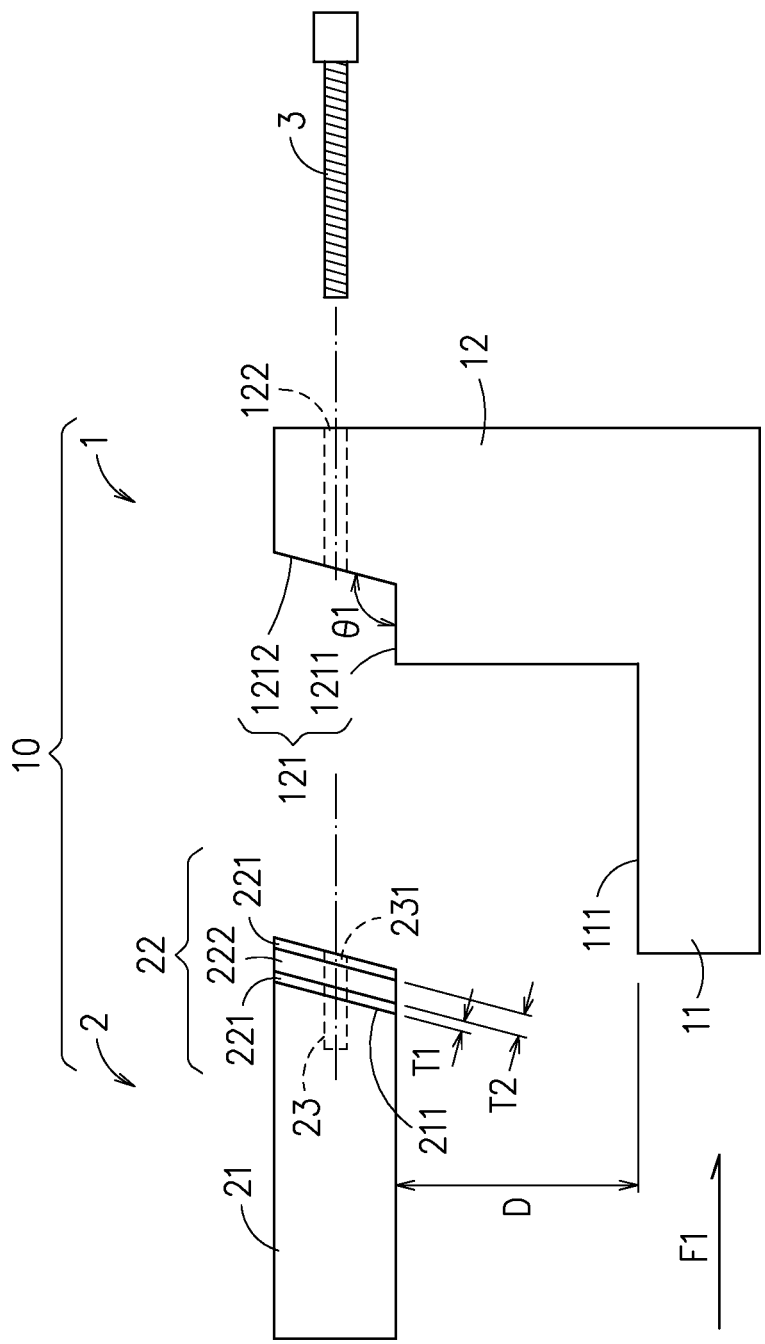
FIG. 3 is a schematic side view of FIG. 3.

Referring now to FIG. 2 and FIG. 3, since the two clamping devices 10 are arranged symmetrically in structuring, thus only one said clamping device 10 is taken for explanation in details. The clamping device 10 includes a metal carrier 1 and a damper 2.

The metal carrier 1 further has a carrying portion 11 and a supporting portion 12. The carrying portion 11 has a carrying surface 111 parallel to a first direction F1 (i.e., the normal line of the carrying surface 111 is perpendicular to the first direction F1).

The supporting portion 12, furnished onto the carrying portion 11, has a stair portion 121 constructed at one side of a top of the supporting portion 12. The stair portion 121 has a plane surface 1211 parallel to the first direction F1 and a standing surface 1212 having a slope. An angle θ1 between the standing surface 1212 and the plane surface 1211 is larger than 90°.

The damper 2 has a metal clamping portion 21 and a damping portion 22. The metal clamping portion 21 has an inclined surface 211 facing the damping portion 22. A slope of the inclined surface 211 is identical to that of the standing surface 1212.

The damping portion 22 is formed by laminating two elastic layers 221 and a metal layer 222, in which the metal layer 222 is sandwiched by the two elastic layers 221. In addition, slopes of the two elastic layers 221, the metal layer 222, the inclined surface 211 and the standing surface 1212 are all the same. Also, one said elastic layer 221 that locates the closest to the metal clamping portion 21 is connected with the inclined surface 211. A thickness T1 of each said elastic layer 221 is smaller than another thickness T2 of the metal layer 222.

It shall be noted that, in this disclosure, numbers of the elastic layers 221 and the metal layers 222 are not limited to the aforesaid embodiment, but actually can be determined per practical requirements. One necessary limitation for the elastic layers 221 and the metal layers 222 is an interlacing arrangement.

The damper 2 is assembled to the metal carrier 1 by having the damping portion 22 to be squeezed between the metal clamping portion 21 and the supporting portion 12, and by having bottom surfaces of the damping portion 22 and the metal clamping portion 21 (partly) to contact with the plane surface 1211 of the stair portion 121. An end of the metal clamping portion 21 that is away from the damping portion 22 is protruded out of the supporting portion 12, and the bottom surface of the metal clamping portion 21 is parallel to the first direction F1 by spacing a distance D to the carrying surface 111.

In practice, the damper 2 is separable from, i.e. attachably mounted to, the supporting portion 12. For appropriate engagement, aligned through holes 122, 231 and screws holes 23 are constructed to the supporting portion 12, the damping portion 22 and the metal clamping portion 21, respectively. One connecting bolt 3 is introduced to engage the supporting portion 12 and the damper 2 by plugging the corresponding through holes 122, 231 and screw hole 23, with the connecting bolt 3 to be substantially parallel to the first direction F1. While in screwing, the connecting bolt 3 penetrates orderly the supporting portion 12 and the damping portion 22, and then engages tightly at the metal clamping portion 21. It is noted that, in FIG. 2, only one connecting bolt 3 out of total three bolts is shown.

In this disclosure, the metal carrier 1, the metal clamping portion 21 and the metal layer 222 are made of, but not limited to, carbon steels; and, the elastic layer 221 is made of, but not limited to, a non-metallic material with nonlinear elasticity, such as a rubber, an asphalt or the like.

Figure 5:
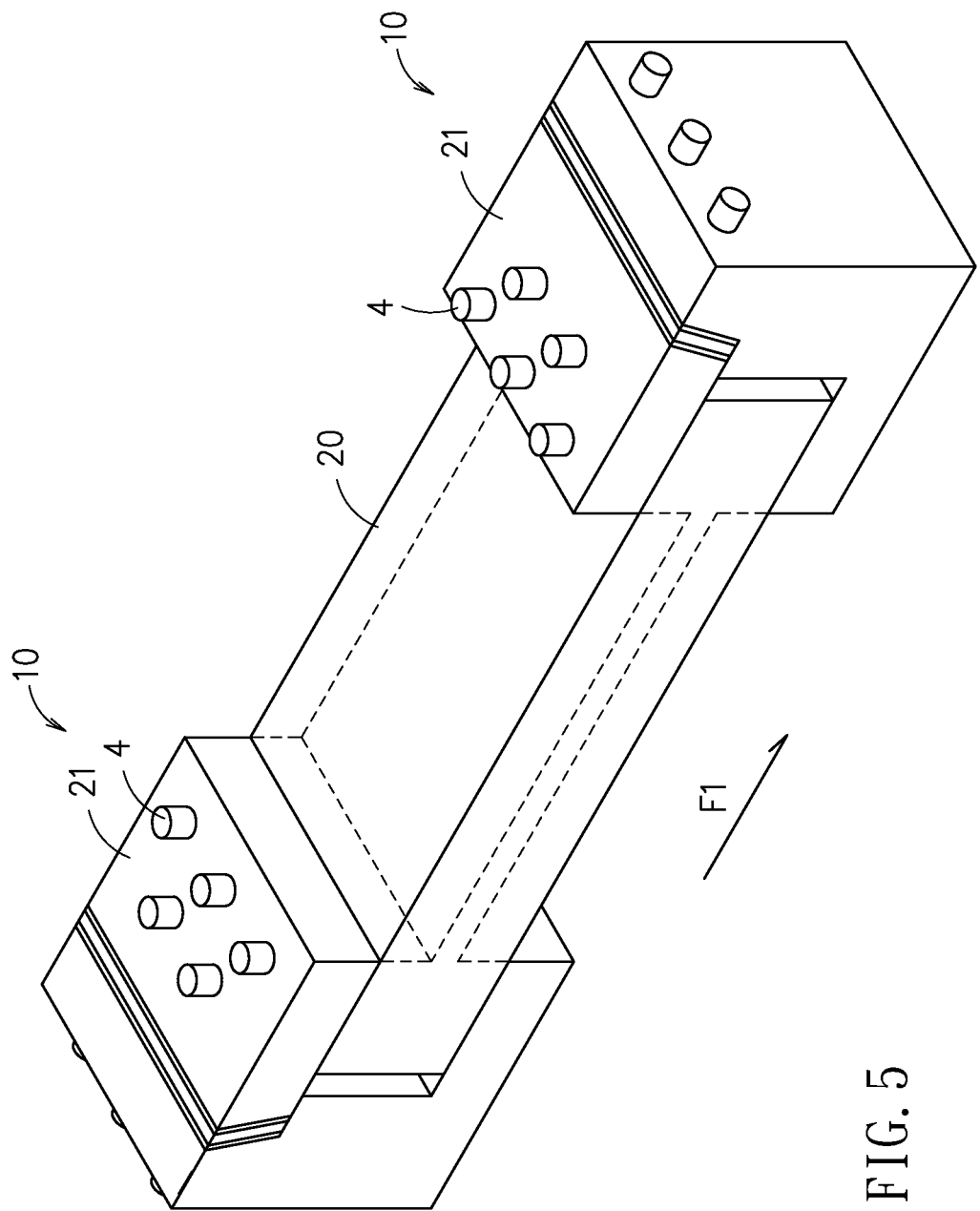
FIG. 5 is a schematic perspective view of a workpiece clamped by the fixture of FIG. 1.

In addition, the Young's modulus of the metallic material for the metal carrier 1, the metal clamping portion 21 and the metal layer 222 can be greater than that for the workpiece 20 (as shown in FIG. 5), and the Young's modulus of the metallic material for the metal layer 222 is greater than that of the non-metallic material for each the elastic layer 221.

Figure 4:
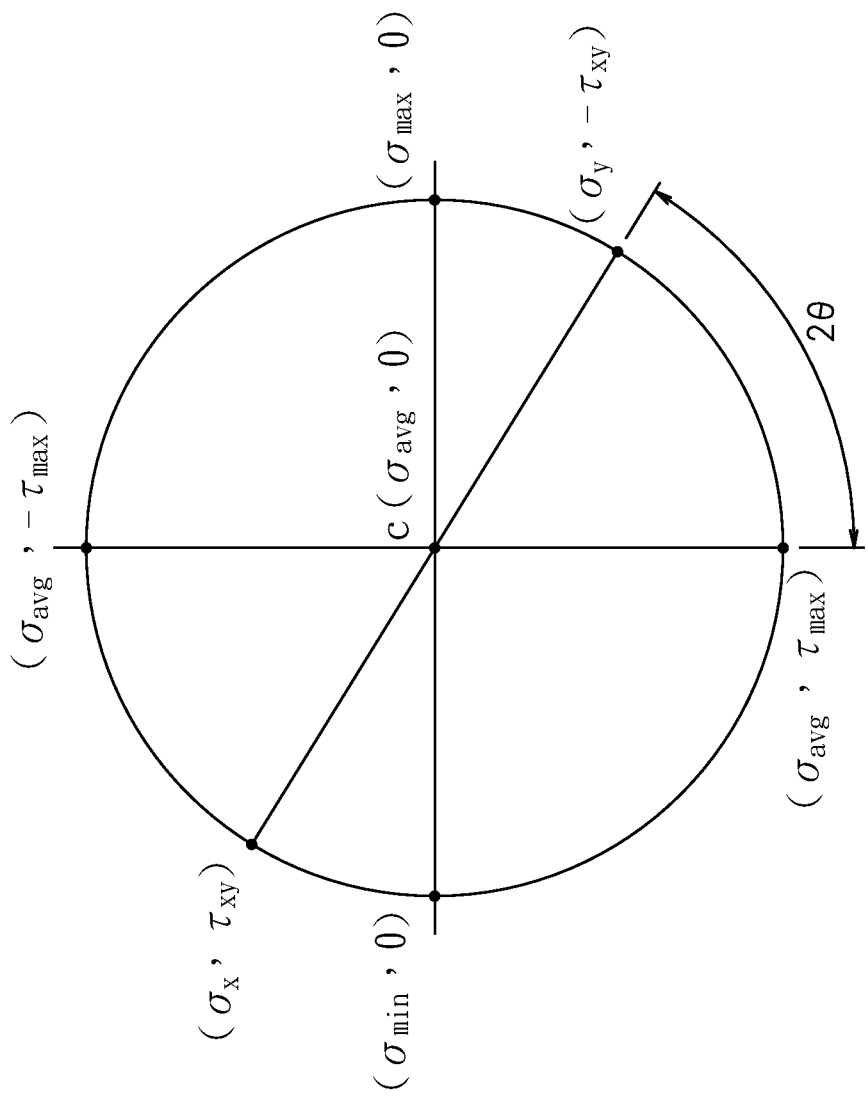
FIG. 4 shows Mohr's circle for slopes of the damper in accordance with this disclosure.

Referring now to FIG. 4, the Mohr's circle is adopted to find out the angling of the surface having the maximum shearing stress at the fixture for a thin-walled workpiece 100 provided by this disclosure, so that the slope of the elastic layer 221 can be determined. Thus, according to the following equation for maximum shearing stress:

$$\tau_{max} = \sqrt{\left(\frac{\sigma_x - \sigma_y}{2}\right)^2 + (\tau_{xy})^2},$$

the angle θ of the surface having the maximum shearing stress can be calculated. Based on the aforesaid arrangement of the fixture for a thin-walled workpiece 100, an angle θ1 would be about 105°, i.e., θ1=90+θ:

$$\tan 2\theta = \frac{-2\tau_{xy}}{\sigma_x - \sigma_y}.$$

Referring now to FIG. 2 and FIG. 5, the two clamping devices 10, aligned in the first direction F1 in a symmetric manner, are to clamp the workpiece 20 at two opposing ends thereof. Corresponding aligned screw holes 212 are furnished to the metal clamping portion 21, the carrying portion 11 and the workpiece 20, such that fixing bolts 4 can be applied to mate the respective screw holes 212, by having each individual fixing bolt 4 to be substantially perpendicular to the first direction F1. The fixing bolt 4 is orderly introduced to pass through the metal clamping portion 21, the workpiece 20 and the carrying portion 11, so that the workpiece 20 can be fixed onto the carrying surface 111 of the carrying portion 11 (i,e., the state shown in FIG. 5). After the workpiece 20 is fixed between the two clamping devices 10 so as to form the state shown in FIG. 5, the combination of the workpiece 20 and the fixture 100 can then be moved onto a machine for machining both opposing sides of the workpiece 20 to the dash-lined workpiece 20 in FIG. 5.

Figure 6:
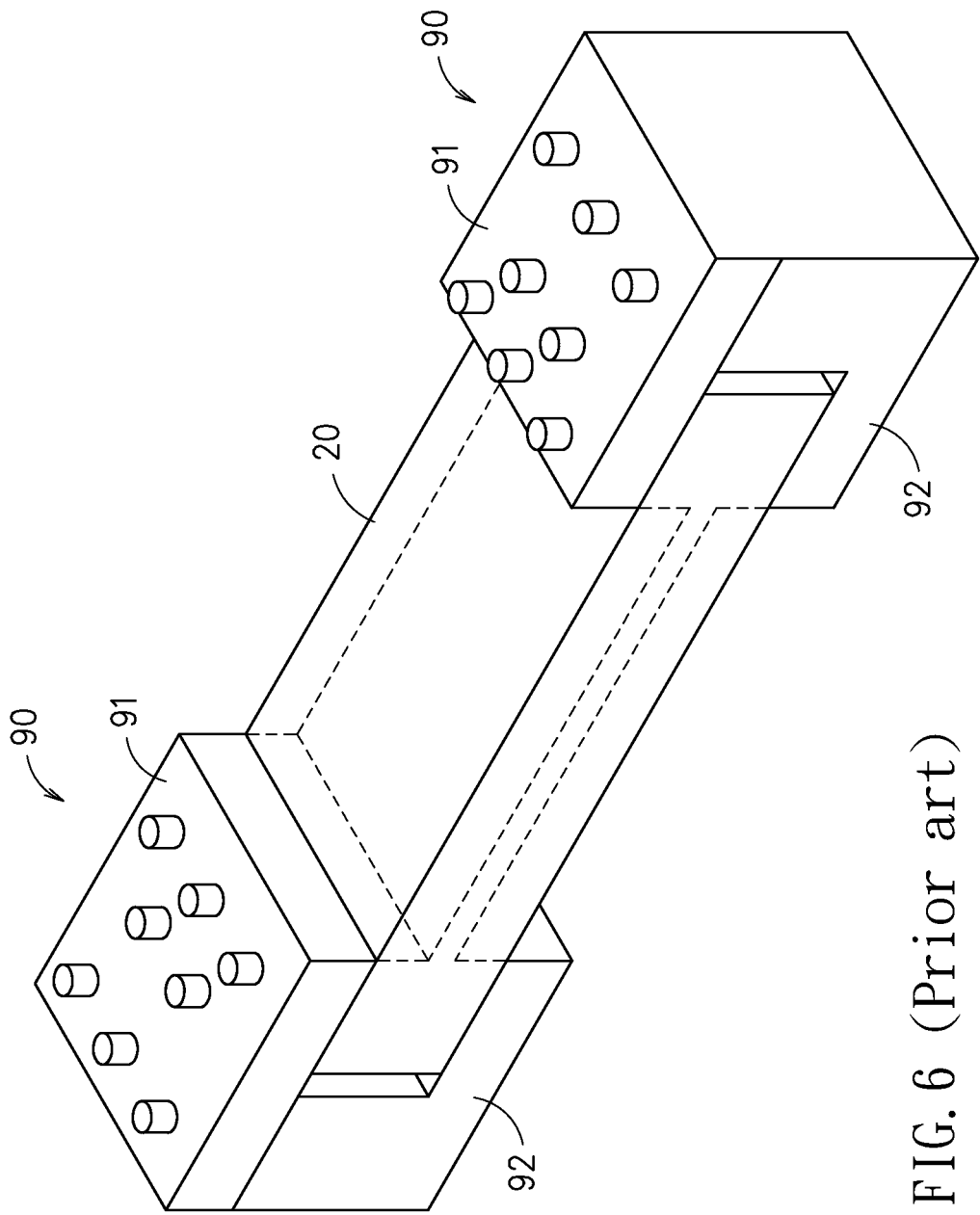
FIG. 6 is a schematic perspective view of a workpiece clamped by a conventional fixture.

By performing respective machining simulations upon the workpiece of FIG. 5 and that of FIG. 6, it is confirmed that the workpiece fixed by the fixture of this disclosure can provide a remarkable and better damping performance.

Figure 7:
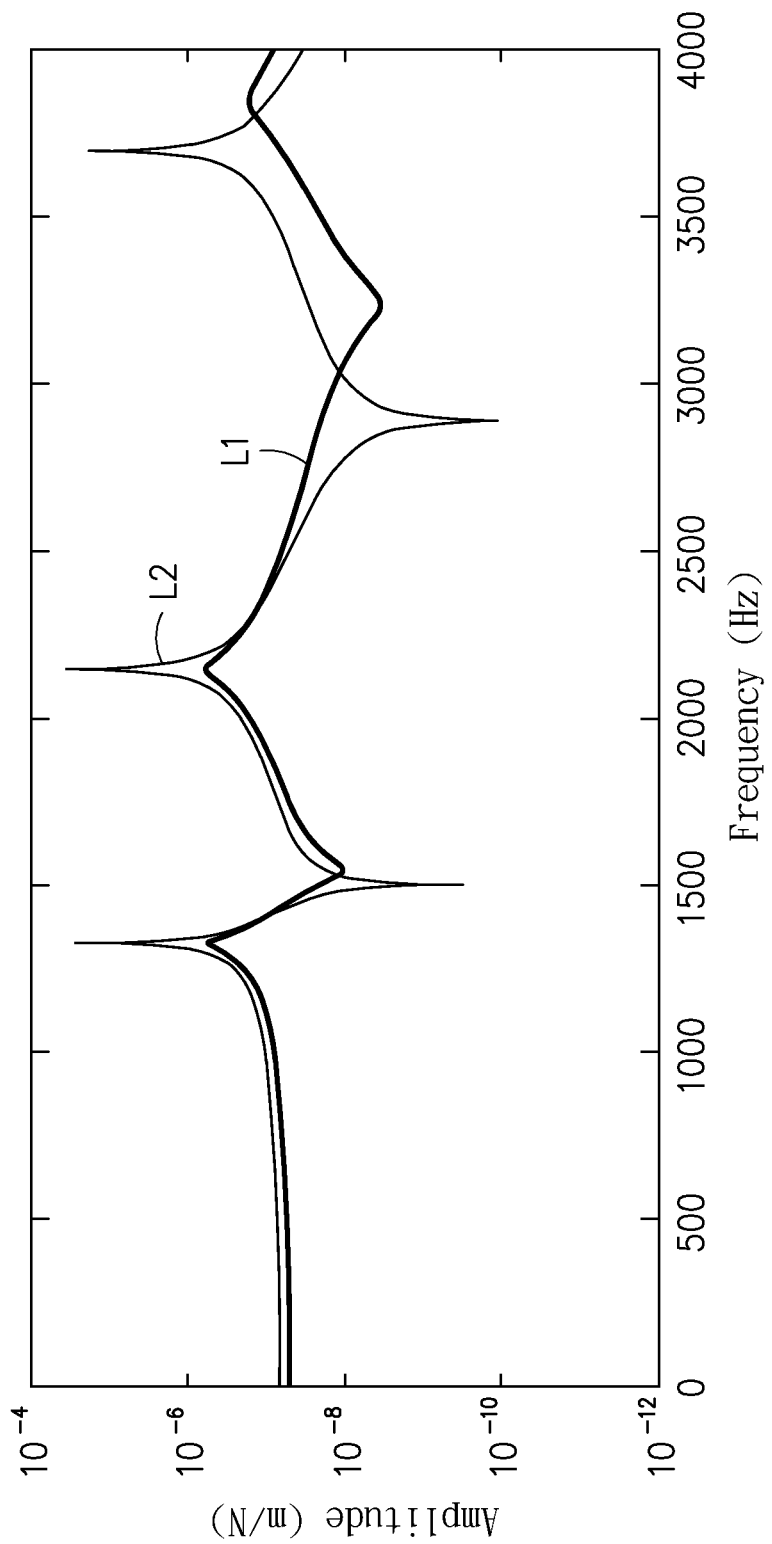
FIG. 7 is a comparison of frequency responses between FIG. 5 and FIG. 6.

Referring now to FIG. 7, the bold curve L1 stands for the milling of the clamped workpiece of FIG. 5, while the fine curve L2 stands for the milling of the clamped workpiece of FIG. 6. It is obvious that the milling of the clamped workpiece by the fixture of this disclosure can be performed in significantly reduced amplitudes.

Figure 8:
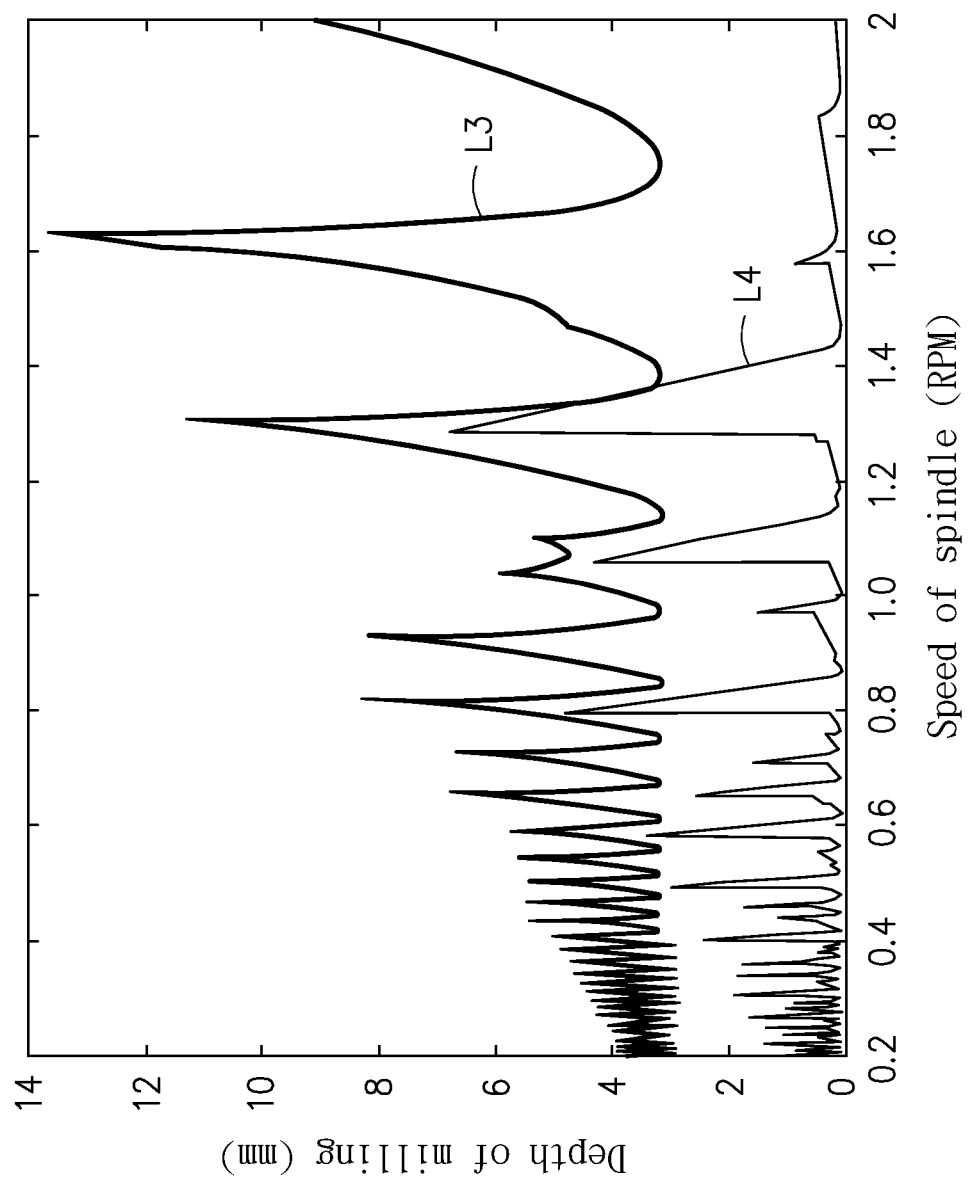
FIG. 8 is a steady-state plot of milling depths with respect to spindle speeds for machining with FIG. 5 and FIG. 6.

Referring now to FIG. 8, the bold curve L3 stands for the milling of the clamped workpiece of FIG. 5, while the fine curve L4 stands for the milling of the clamped workpiece of FIG. 6. It is confirmed that the milling of the clamped workpiece by the fixture of this disclosure can enhance greatly the machining performance in the depth of milling at each specific speed of spindle.

In summary, by providing the fixture having an inclined layered structure with multi-mode high-damping ability for a thin-walled workpiece in this disclosure, the best damping position can be located, a multi-mode structure can be effectively damped, and an inclined layered structure for damping vibrations can be systematically designed according to versatile demands.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A fixture for a thin-walled workpiece, comprising two clamping devices, each of the two clamping devices further comprising:
   a metal carrier, further including:
      a carrying portion, having a carrying surface; and
      a supporting portion, located on the carrying portion, having a stair portion at a top thereof, the stair portion having a plane surface and a standing surface having a slope; and
   a clamper, further including:
      a metal clamping portion, having an end formed as an inclined surface, the inclined surface having another slope identical to the slope of the standing surface; and
      a damping portion, having at least two elastic layers and at least one metal layer laminated in an interlacing arrangement and having the same slope as the inclined surface, one of the at least two elastic layers being connected with the inclined surface of the metal clamping portion, each of the at least one elastic layer being made of an elastic non-metallic material.

2. The fixture for a thin-walled workpiece of claim 1, wherein an angle between the standing surface of the supporting portion and the plane surface is larger than 90°.

3. The fixture for a thin-walled workpiece of claim 1, wherein a thickness of each of the at least two elastic layers is smaller than that of the at least one metal layer sandwiched by two said elastic layers.

4. The fixture for a thin-walled workpiece of claim 1, wherein a Young's modulus of a metallic material for the at least one metal layer is larger than that of the material for both the at least two elastic layers.

5. The fixture for a thin-walled workpiece of claim 1, wherein the metal carrier, the metal clamping portion and the at least one metal layer are all made of carbon steels.

6. The fixture for a thin-walled workpiece of claim 1, wherein a Young's modulus of a metallic material for the metal carrier, the metal clamping portion and the at least one metal layer is larger than that for a workpiece clamped by the fixture.

7. The fixture for a thin-walled workpiece of claim 1, wherein each of the at least two elastic layers is made of a nonlinear elastic material selected from the group of a rubber and an asphalt.

8. The fixture for a thin-walled workpiece of claim 1, wherein the clamper is attachably mounted to the supporting portion.

9. The fixture for a thin-walled workpiece of claim 8, wherein the supporting portion and the clamper are engaged by respective screw holes, through holes and connecting bolts.

* * * * *